United States Patent
Kurihara

(10) Patent No.: US 9,673,477 B2
(45) Date of Patent: Jun. 6, 2017

(54) FUEL CELL

(71) Applicant: TOYOTA JIDOSHA KABUSHIKI KAISHA, Toyota-shi, Aichi-ken (JP)

(72) Inventor: Takuya Kurihara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/868,710

(22) Filed: Sep. 29, 2015

(65) Prior Publication Data

US 2016/0104911 A1 Apr. 14, 2016

(30) Foreign Application Priority Data

Oct. 14, 2014 (JP) .................................. 2014-209749

(51) Int. Cl.
*H01M 8/24* (2016.01)
*H01M 8/2485* (2016.01)
*H01M 8/1018* (2016.01)

(52) U.S. Cl.
CPC .. *H01M 8/2485* (2013.01); *H01M 2008/1095* (2013.01)

(58) Field of Classification Search
CPC ......... H01M 8/24835; H01M 8/24855; H01M 2008/1095; Y02E 60/50
See application file for complete search history.

(56) References Cited

U.S. PATENT DOCUMENTS

| 8,470,490 B2 | 6/2013 | Takeyama | |
|---|---|---|---|
| 2010/0291458 A1* | 11/2010 | Takeyama | H01M 8/2485 429/458 |

FOREIGN PATENT DOCUMENTS

| JP | 2003-178791 | 6/2003 |
|---|---|---|
| JP | 2007-141639 A | 6/2007 |
| JP | 2008-103241 A | 5/2008 |
| JP | 2008-288080 | 11/2008 |
| JP | 2009-158338 | 7/2009 |
| WO | WO 2008/050816 A1 | 5/2008 |

* cited by examiner

*Primary Examiner* — Brittany Raymond
(74) *Attorney, Agent, or Firm* — Finnegan, Henderson, Farabow, Garrett & Dunner, LLP

(57) ABSTRACT

A fuel cell is provided, which includes a fuel cell stack having a stacked structure in which a plurality of unit cells generating electric power are stacked, terminal plate that is joined to end of the fuel cell stack and collects the generated electric power, and insulating plate disposed outside the terminal plate. The terminal plate is provided with a first gas discharge manifold communicating with an in-stack gas discharge manifold on a gas discharge side. The in-stack gas discharge manifold penetrates the fuel cell stack and extends in a stacking direction of the fuel cell stack. The insulating plate is provided with a second gas discharge manifold communicating with the first gas discharge manifold. The insulating plate is formed in a shape so that, in a fuel cell arranging state in which the in-stack gas discharge manifold is substantially horizontal, a manifold lower wall of the second gas discharge manifold is located vertically below a manifold lower wall of the first gas discharge manifold. Accordingly, residual moisture in the gas discharge manifold is reduced, while securing flexibility of a mounting design of the fuel cell.

5 Claims, 3 Drawing Sheets

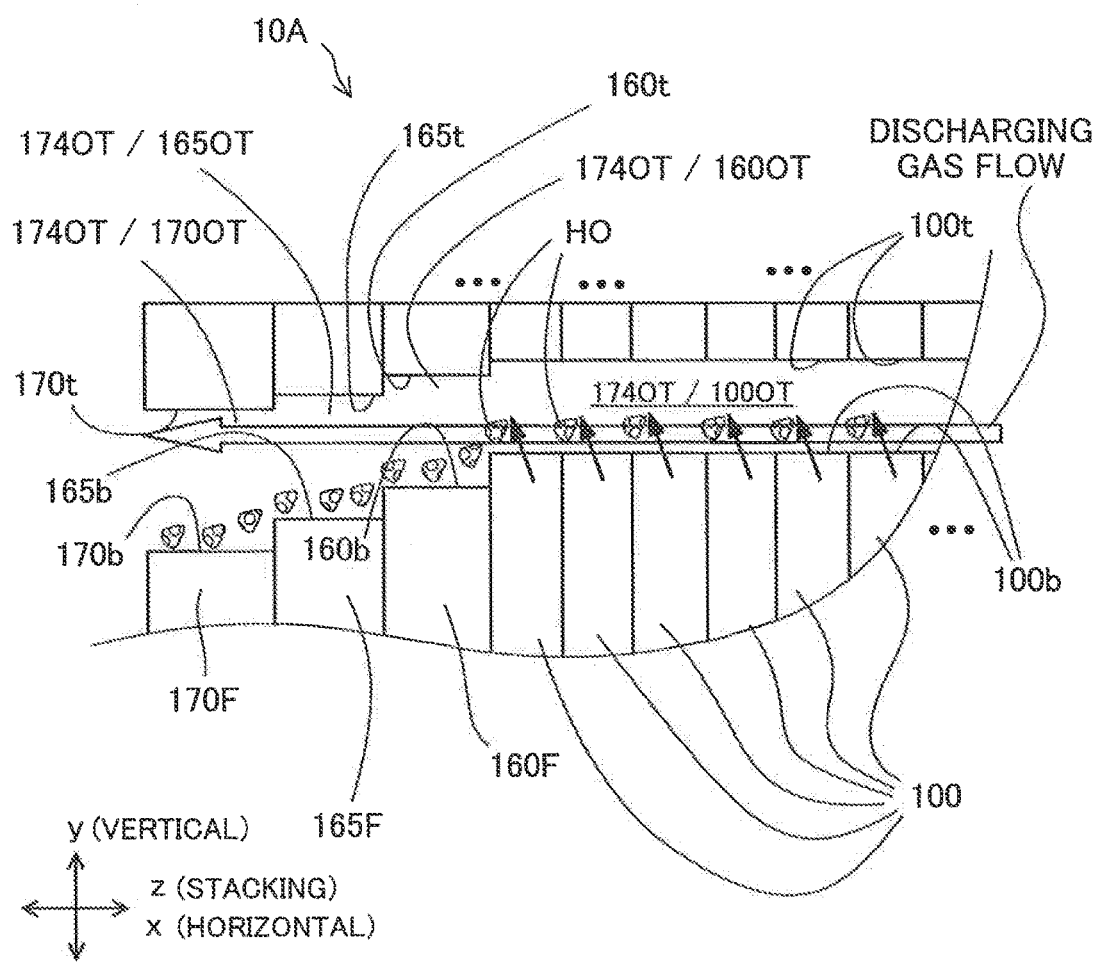

FUEL CELL

CROSS REFERENCE TO RELATED APPLICATION

The present application claims priority from Japanese application P2014-209749 filed on Oct. 14, 2014, the content of which is hereby incorporated by reference into this application.

BACKGROUND

The present invention relates to a fuel cell.

A fuel cell is provided with a fuel cell stack having a stacked structure in which a plurality of unit cells of the fuel cell are stacked, where each unit cell generates power. In the fuel cell stack, terminal plates which function as power collectors are provided to be joined to the unit cells located at ends of the fuel cell stack, and insulating plates are further provided outside the terminal plates. The fuel cell is provided with a gas supply manifold and a gas discharge manifold which extend in cell stacking directions so that they penetrate the fuel cell stack, and the terminal plates and the insulating plates which were joined to the ends of the fuel cell stack. Each unit cell of the fuel cell is supplied with gas from the gas supply manifold, and discharges off-gas to the gas discharge manifold. The off-gas collected in the gas discharge manifold is discharged outside the insulating plate via the gas discharge manifold which is also formed in the terminal plates and the insulating plates. Reactive gas such as hydrogen gas, as well as oxygen containing gas such as air, are supplied to the unit cells, and moisture may be contained in each off-gas discharged from the unit cells. More specifically, the off-gas of the reactive gas may contain condensate which is formed from steam blended for humidification and produced water which penetrated an electrolyte membrane, and the off-gas of the air may contain the produced water. If the water contained in the off-gas remains inside the manifold, a flow (discharging) of gas may be blocked by frozen moisture. Therefore, JP2009-158338A proposes a technique to discharge moisture by inclining the gas discharge manifold downwardly toward a discharging direction.

According to the technique proposed in JP2009-158338A, since a fuel cell stack which is formed by stacking unit cells is inclined with respect to the horizontal direction, corresponding to the inclination of the gas discharge manifold, the fuel cell stack has different heights in the vertical direction at one end side and the other end side thereof. Thus, for example, when the fuel cell is mounted on a vehicle, a mounting space must be secured and an interference of the fuel cell with peripheral devices must be avoided, taking the height difference in the vertical direction in consideration, and thereby a mounting design is limited. For this reason, a structure in which the moisture remaining in the gas discharge manifold is reduced while securing flexibility of the mounting design is now demanded.

SUMMARY

In order to solve at least a part of the subject described above, the present invention can be implemented in the following aspects.

(1) According to one aspect of the present invention, a fuel cell is provided. The fuel cell includes a fuel cell stack having a stacked structure in which a plurality of unit cells generating electric power, terminal plate that is joined to ends of the fuel cell stack and collects the generated electric power, and insulating plate disposed outside the terminal plate. The terminal plate is provided with a first gas discharge manifold communicating with an in-stack gas discharge manifold on a gas discharge side. The in-stack gas discharge manifold penetrates the fuel cell stack and extends in a stacking direction of the fuel cell stack. The insulating plate is provided with a second gas discharge manifold communicating with the first gas discharge manifold. The at least one of the insulating plate is formed in a shape so that, in a fuel cell arranging state in which the in-stack gas discharge manifold is substantially horizontal, a manifold lower wall of the second gas discharge manifold is located vertically below a manifold lower wall of the first gas discharge manifold.

In the fuel cell of the aspect described above is supposed to be oriented so that the in-stack gas discharge manifold which penetrates the fuel cell stack and extends in the stacking direction of the fuel cell is substantially horizontal. The phrase "substantially horizontal" as used herein refers to an inclination about less than about ±5 degrees from the horizontal directions, which is a normal precision of dimensions in manufacturing the fuel cell, with respect to longitudinal directions and width direction of the vehicle. If the in-stack gas discharge manifold of the fuel cell is not formed straightly (e.g., curved or sharply bent), part of the in-stack gas discharge manifold close to the terminal plate may be substantially horizontal. Thus, according to the fuel cell of this aspect, since it is not necessary to stack the unit cells themselves so as to specifically incline the unit cells with respect to the horizontal directions, or to mount the fuel cell stack so as to specifically incline the fuel cell stack at a particular angle, flexibility of the mounting design at the time of mounting the fuel cell in the above-described arranging state can be secured. In addition, according to the fuel cell of this aspect, in order for moisture outflowed from each unit cell of the fuel cell stack into the in-stack gas discharge manifold to ride on a flow of gas and to be discharged to the gas discharge side, on the gas discharge side, the in-stack gas discharge manifold communicates with the first gas discharge manifold of the terminal plate, and the second gas discharge manifold of the insulating plate in this order. Further, in the fuel cell arranging state in which the in-stack gas discharge manifold is substantially horizontal, the manifold lower wall downward in the vertical directions of the second gas discharge manifold is lower in the vertical directions than the manifold lower wall downward in the vertical directions of the first gas discharge manifold so that the lowering steps toward the downstream the gas discharge are formed in the first gas discharge manifold and the second gas discharge manifold. Therefore, according to the fuel cell of this aspect, since the moisture reached to the first gas discharge manifold on the gas discharge side is efficiently discharged to the second gas discharge manifold also with the weight of moisture itself in addition to the flow of gas, the residual moisture in the gas discharge manifold can be reduced. In addition, since the reduction of the residual moisture can be achieved only by the shape of the second gas discharge manifold in the insulating plate, fabrications of the terminal plate and the insulating plate which are constituent members of the fuel cell are simpler, thereby it is also useful for cost reduction.

(2) In the fuel cell of the aspect described above, in the fuel cell arranging state, the terminal plate may be formed in a shape so that the manifold lower wall of the first gas discharge manifold is located vertically below a manifold lower wall of the in-stack gas discharge manifold. Thus, moisture reached to the unit cell at the gas discharge side end in the fuel cell stack can efficiently be discharged to the first gas discharge manifold also with the weight of moisture itself in addition to the flow of gas, and the moisture can efficiently be discharged also from the first gas discharge manifold to the second discharge manifold. Therefore, the effectiveness in the reduction of residual moisture in the gas discharge manifold can be improved.

(3) In the fuel cell of the aspect described above, in the fuel cell arranging state, the insulating plate may be formed in a shape so that a manifold upper wall of the second gas discharge manifold is located vertically below a manifold upper wall of the first gas discharge manifold, or (4) in the fuel cell arranging state, the terminal plate may be formed in a shape so that a manifold upper wall of the first gas discharge manifold is located vertically below a manifold upper wall of the in-stack gas discharge manifold. Thus, gas flowed to the first gas discharge manifold collides with the manifold upper wan of the first gas discharge manifold, and gas flowed to the second gas discharge manifold collides with the manifold upper wall of the second gas discharge manifold. Due to such collisions of the gas, since the gas (at least portion of the gas) flows toward the manifold lower wall downward in the vertical directions of the first gas discharge manifold and the manifold lower wall downward in the vertical directions of the second gas discharge manifold, discharging efficiency of the moisture which rides the flow of gas is further improved, and this is desirable in the improvement of the effectiveness of the reduction of residual moisture in the gas discharge manifold.

Note that the present invention can be implemented in various forms, for example, can be implemented in a form of a method of manufacturing a fuel cell.

BRIEF DESCRIPTION OF THE DRAWINGS

The present disclosure is illustrated by way of example and not by way of limitation in the figures of the accompanying drawings, in which the like reference numerals indicate like elements and in which:

FIG. 3 is a view schematically illustrating a manifold structure at a gas discharge side in a fuel cell of another embodiment.

DETAILED DESCRIPTION OF EMBODIMENTS

Figure 1:
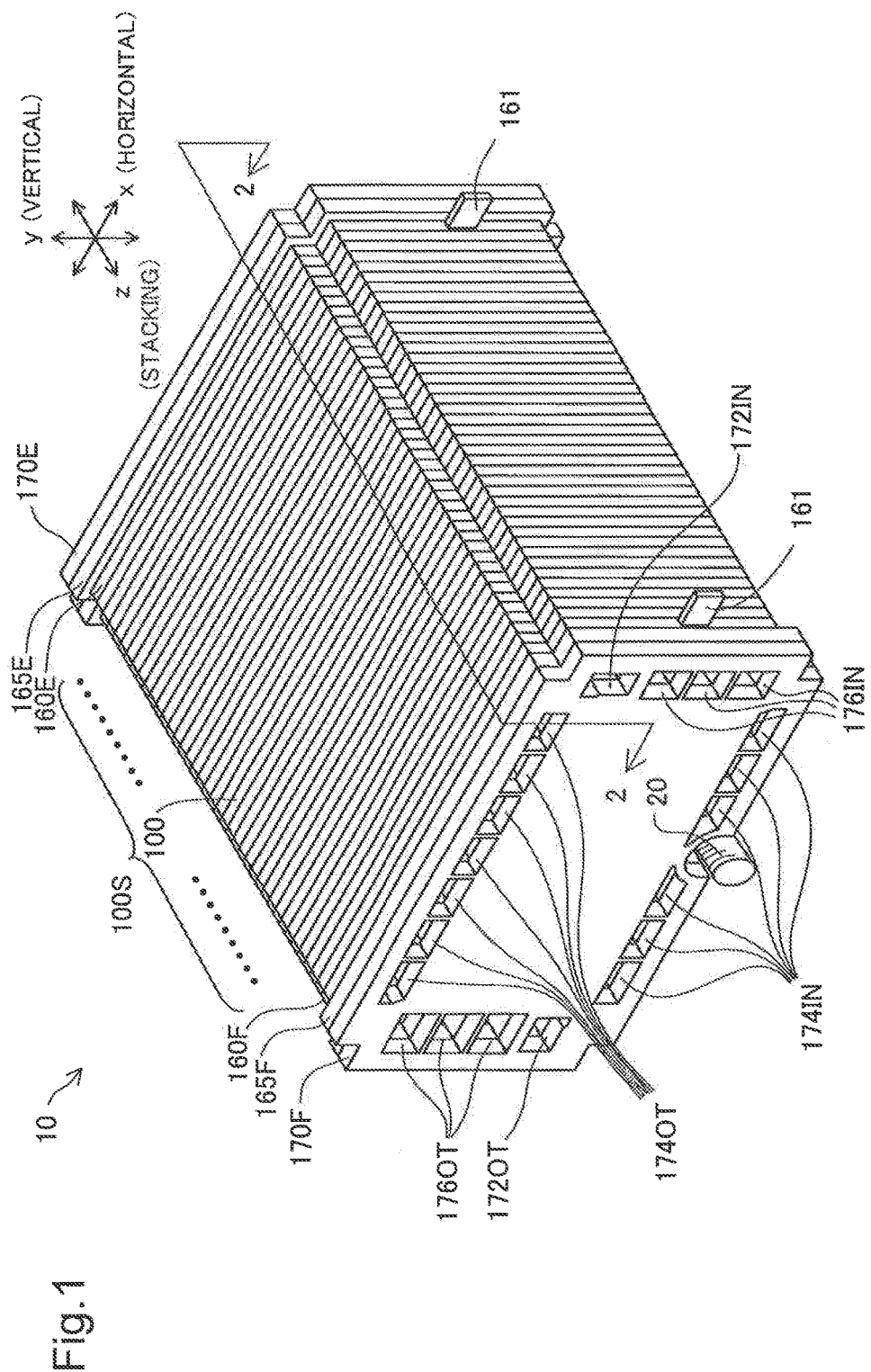
FIG. 1 is a perspective view schematically illustrating a structure of a fuel cell as one embodiment of the present invention.

Hereinafter, embodiments of the invention are described with reference to the accompanying drawings. FIG. 1 is a perspective view schematically illustrating a structure of a fuel cell 10 as one embodiment of the present invention. The fuel cell 10 pinches a fuel cell stack 100S by a pair of end plates 170F and 170E. The fuel cell stack 100S has a stacked structure in which a plurality of unit cells 100 (each unit cell generates power) are stacked in Z-directions (hereinafter, also referred to as "stacking directions"). The fuel cell 10 is fastened in a state where it is pressurized in the cell stacking directions with a fastening bolt 20 located at a lower end at the center of the fuel cell 10, and fastening bolts (not illustrated) located at corners of the fuel cell 10. The fuel cell 10 has, on one end side, i.e., between the end plate 170F and the unit cell 100 which are located on a front end side in the drawing, an insulating plate 165F and a terminal plate 160F which are located on the front end side in this order from the end plate 170F side. Similarly, the fuel cell 10 also has, between the end plate 170E and the unit cell 100 which are located on a rear end side, an insulating plate 165E and a terminal plate 160E which are located on the rear end side in this order from the end plate 170E side. That is, the fuel cell 10 pinches the fuel cell stack 100S by the terminal plates 160F and 160E, the insulating plates 165F and 165E, and the end plates 170F and 170E so that the terminal plates 160F and 160E which function as power collectors are joined to the unit cells 100 located at both ends of the fuel cell stack 100S. Each of the terminal plates 160F and 160E is provided with a current collection terminal 161 which functions as the power collector comprised of a steel plate having a good conductivity, and feeds the collected power to an external circuit. The insulating plates 165F and 165E are made of natural or synthetic resin provided with a suitable insulating property.

Each of the unit cell 100, the terminal plates 160F and 160E, the insulating plates 165F and 165E, and the end plates 170F and 170E is formed in a plate structure having a substantially rectangular external shape, where a long side is oriented in X-directions and a short side in Y-directions (vertical directions). In this case, the X-directions are directions perpendicular to the Y-directions which are the vertical directions, and since an XY plane is along the plate surface of each unit cell 100, as illustrated in FIG. 1, the stacking directions (Z-directions) of the unit cells 100 in the fuel cell stack 100S are directions perpendicular to both the X-directions and the Y-directions. Thus, the fuel cell 10 is mounted on a vehicle (not illustrated) in a posture in which the stacking directions (Z-directions) of the unit cells 100 are oriented at least in the horizontal directions. The mounting posture is as follows, taking vehicle longitudinal directions in consideration. If the X-directions in FIG. 1 indicate the vehicle longitudinal directions, the stacking directions (Z-directions) of the unit cells 100 are in vehicle width directions, and the fuel cell 10 is mounted in a posture in which the fuel cell 10 is oriented horizontal in the vehicle width directions. If the X-directions in FIG. 1 indicate the vehicle width directions, the fuel cell 10 is mounted in a posture in which the fuel cell 10 is oriented horizontal in the vehicle longitudinal directions which are the stacking directions of the unit cells 100.

Figure 2:
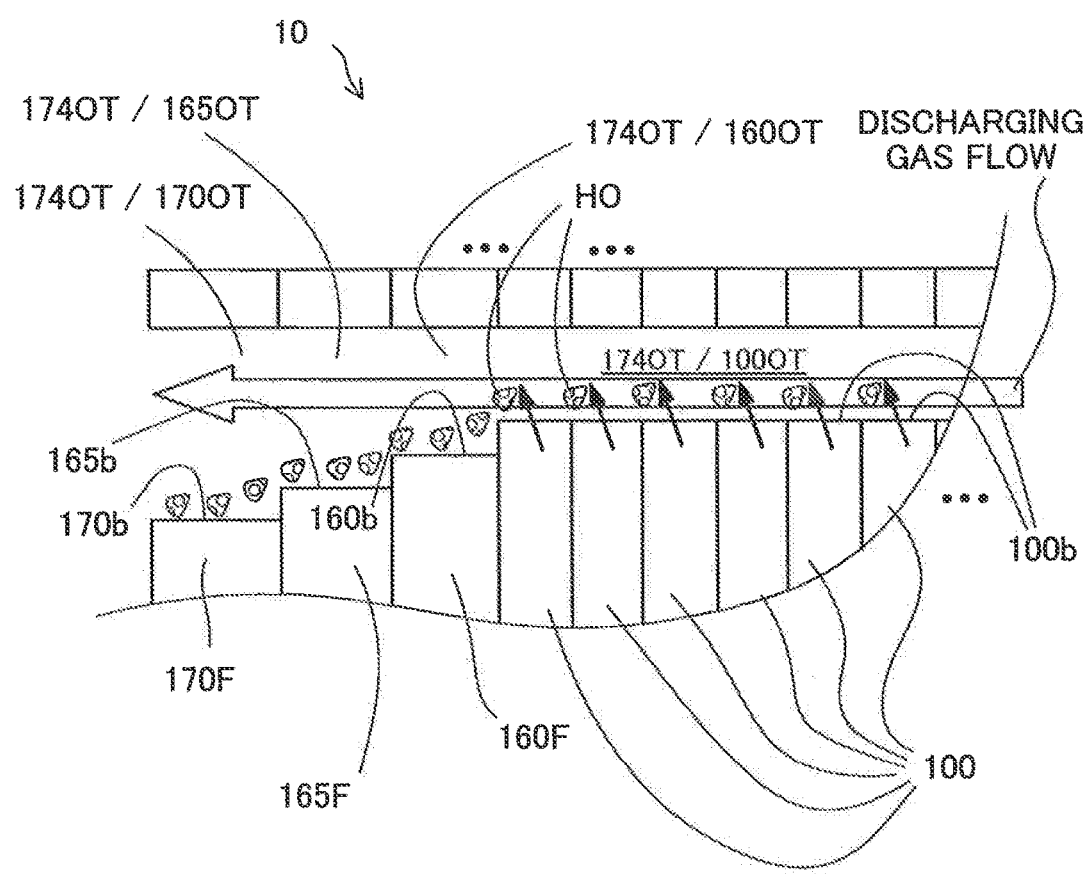
FIG. 2 is a view schematically illustrating a manifold structure at a gas discharge side, by using a partial cross section of the fuel cell stack taken along a line 2-2 of FIG. 1.

Next, a manifold structure which is involved with supply and discharge of gas, and supply and discharge of cooling water in the fuel cell 10 is described. FIG. 2 is a partial cross-sectional view of the fuel cell stack 100S taken along a line 2-2 of FIG. 1, where the manifold structure at a gas discharge side is schematically illustrated. Returning to FIG. 1, the fuel cell 10 includes, between the end plate 170F on the front end side and the unit cell 100 at the rear end of the fuel cell stack 100S, a fuel gas supply manifold 172IN and a fuel gas discharge manifold 172OT, a plurality of oxidizing gas supply manifolds 174IN and a plurality of oxidizing gas discharge manifolds 174OT, and a plurality of cooling water supply manifolds 176IN and a plurality of cooling water discharge manifolds 176OT. Each manifold is formed by aligning through-holes, each of which is formed in the end plate 170F, the insulating plate 165F, the terminal plate 160F, and the unit cells 100 of the fuel cell stack 100S which are located on the front end side, along a line parallel to the cell stacking directions.

As illustrated in FIG. 2, each of the oxidizing gas discharge manifolds 174OT penetrates the unit cells 100 of the fuel cell stack 100S and extends in the stacking directions of the cells, and forms an in-stack gas discharge manifold 100OT which has a flow path having the same cross section throughout the stacked range of the unit cells 100. The terminal plate 160F on the front end side includes first gas discharge manifolds 160OT which communicate with the in-stack gas discharge manifolds 100OT, respectively at the gas discharge side, where each of the first gas discharge manifolds 160OT is part of the oxidizing gas discharge manifold 174OT. The insulating plate 165E on the front end side joined to the terminal plate 160F includes second gas discharge manifolds 165OT which communicate with the first gas discharge manifolds 160OT, respectively, where each of the second gas discharge manifolds 165OT is part of the oxidizing gas discharge manifold 174OT. The end plate 170F on the front end side joined to the insulating plate 165F includes third gas discharge manifolds 170OT which communicate with the second gas discharge manifolds 165OT, respectively, where the third gas discharge manifolds 170OT serve as gas discharge ends of the oxidizing gas discharge manifolds 174OT.

As described above, the fuel cell 10 is mounted on the vehicle (not illustrated) in the posture in which the stacking directions of the unit cells 100 are oriented in the horizontal directions, and a flow path direction of the oxidizing gas discharge manifolds 174OT corresponds the horizontal directions in the mounting posture. As illustrated in FIG. 2, in the mounting posture of the fuel cell 10 described above, the terminal plate 160F is formed in a shape so that a manifold lower wall 160*b* downward in the vertical direction of the first gas discharge manifold 160OT is located downward in the vertical direction of a manifold lower wall 100*b* downward in the vertical direction of the in-stack gas discharge manifold 100OT. Further, the insulating plate 165F is formed in a shape so that a manifold lower wall 165*b* downward in the vertical direction of the second gas discharge manifold 165OT is located downward in the vertical direction of the manifold lower wall 160*b* downward in the vertical direction of the first gas discharge manifold 160OT. Further, the end plate 170F is formed in a shape so that a manifold lower wall 170*b* downward in the vertical direction of the third gas discharge manifold 170OT is located downward in the vertical direction of the manifold lower wall 165*b* downward in the vertical direction of the second gas discharge manifold 165OT. As the result of forming each manifold opening of the terminal plate 160F, the insulating plate 165F, and the end plate 170F in the shape as described above, the manifold lower walls are lower from the unit cell 100 at the end toward the end plate 170F. That is, the fuel cell 10 has steps on the gas discharge side of the oxidizing gas discharge manifold 174OT, which are lower toward the gas discharge side. The steps, i.e., height differences of the manifold lower walls in the vertical directions are reserved at dimensions of about several millimeters, which are certainly guaranteed even if stacking offsets of any of the unit cell 100, the terminal plate 160F, the insulating plate 165F, and the end plate 170E exist within their tolerance ranges.

Similar to the oxidizing gas discharge manifold 174OT described above, the oxidizing gas supply manifold 174IN the fuel gas supply manifold 172IN, the fuel gas discharge manifold 172OT, the cooling water supply manifold 176IN, and the cooling water discharge manifold 170OT also have supply and discharge manifolds inside the fuel cell stack 100S, which extend in the cell stacking directions. These supply and discharge manifolds are formed to have the same shape as the supply and discharge manifolds within the stack also in the terminal plate 160F, the insulating plate 165F, and the end plate 170F.

On the other hand, the supply and discharge manifolds are not formed in the end plate 170E, the insulating plate 165E, and the terminal plate 160E which are located on the rear end side. This is because the fuel cell stack 100S of this embodiment is a type of fuel cell in which the reactive gas (fuel gas and oxidizing gas) and cooling water are supplied from the end plate 170F on the front end side to each unit cell 100 via the supply manifolds, while the discharging gas and the discharging water from each unit cell 100 are discharged from the end plate 170F on the front end side to outside via the discharge manifolds. Note that the embodiment of the present invention is not limited to the type described above, and the fuel cell stack may be other various types, such as a type in which the reactive gas and the cooling water are supplied from the end plate 170F on the front end side, while the discharging gas and the discharging water are discharged from the end plate 170E on the rear end side to outside. In this case, the terminal plate 160E, the insulating plate 165E, and the end plate 170E which are located on the rear end side (i.e., on the gas discharge side) are formed in the same shape as the embodiment described above, thereby securing the steps in each manifold as described above.

The plurality of oxidizing gas supply manifolds 174IN of the fuel cell 10 in this embodiment are arranged in the X-directions (long-side directions) along an outer edge portion at a lower end of the end plate 170F on the front end side, and the plurality of oxidizing gas discharge manifolds 174OT are arranged in the X-directions along an outer edge portion at an upper end of the end plate 170F on the front end side. Further, the fuel gas supply manifold 172IN of the fuel cell 10 in this embodiment is arranged in an upper end portion in the Y-directions (short-side directions) of an outer edge portion at a right end of the end plate 170F on the front end side, and the fuel gas discharge manifold 172OT is arranged in a lower end portion in the Y-directions of an outer edge portion at a left end. Further, the plurality of cooling water supply manifolds 176IN of the fuel cell 10 in this embodiment are arranged in the Y-directions below the fuel gas supply manifold 172IN, and the plurality of cooling water discharge manifolds 176OT are arranged in the Y-directions above the fuel gas discharge manifold 172OT. In this case, in the terminal plate 160F, the insulating plate 165F, and the end plate 170F, some or all of the plurality of oxidizing gas discharge manifolds 174OT in the X-directions may be formed in the shape of a single continuous manifold. Further, the shape of each opening of the manifolds may be other than the rectangular shape, such as a circular, elliptical, oval, triangular, or polygonal shape. The plurality of oxidizing gas supply manifolds 174IN located on both sides of the fastening holt 20, the plurality of cooling water supply manifolds 176IN, and the plurality of cooling water discharge manifolds 176OT may also be formed in the shape of a single continuous manifold having a rectangular cross section in the terminal plate 160F, the insulating plate 165F, and the end plate 170E, respectively. Even if the manifold shape has such a rectangular shape, in the mounting posture of the fuel cell 10 described above, the first gas discharge manifold 160OT in the oxidizing gas discharge manifold 174OT is formed so that the manifold lower wall 160*b* is lower than the manifold lower wall 100*b* in the vertical directions, the second gas discharge manifold 165OT is formed so that the manifold lower wall 165*b* is lower than the manifold lower wall 160*b* in the vertical directions, and the third gas discharge manifold 170OT is formed so that the manifold lower wall 170b is lower than the manifold lower wall 165b in the vertical directions.

The terminal plate 160F on the front end side and the terminal plate 160E on the rear end side are provided in order to collect generated power from each unit cell 100, and outputs power collected at the entire plate to outside from the current collection terminals 161 provided at one side of each of the terminal plates 160F and 160E.

The fuel cell 10 of this embodiment provided with the structure described above has the following advantages. First, the fuel cell 10 of this embodiment is supposed to be oriented so that the oxidizing gas discharge manifolds 174OT including the in-stack gas discharge manifolds 100OT penetrating the unit cells 100 of the fuel cell stack 100S and extending in the stacking directions of the unit cells are arranged horizontally. Thus, according to the fuel cell 10 of this embodiment, since it is not necessary to stack the unit cells 100 themselves inclined with respect to the horizontal direction, the degree of freedom of the mounting design at a time of mounting the fuel cell 10 in the above-described arranging state can be secured.

The fuel cell 10 of this embodiment supplies the oxidizing gas supplied from the oxidizing gas supply manifolds 174IN to each unit cell 100 of the fuel cell stack 100S. Then, excessive oxidizing gas is discharged to the oxidizing gas discharge manifolds 174OT from each unit cell 100 as the discharging gas, as illustrated in FIG. 2. Each unit cell 100 discharges the discharging gas to the in-stack gas discharge manifolds 100OT in a so-called forward direction so that the discharging gas does not flow against the flows of gas (discharging gas) in the oxidizing gas discharge manifolds 174OT (in detail, the in-stack gas discharge manifolds 100OT). The discharging gas thus discharged contains produced water HO, and the produced water HO is carried by the discharging gas and flows from each unit cell 100 into the in-stack gas discharge manifolds 100OT. The produced water HO thus inflowed rides the flows of the discharging gas flowing through the in-stack gas discharge manifolds 100OT, is carried to the gas discharge side of the oxidizing gas discharge manifolds 174OT, and is then discharged outside from the end plate 170F.

Thus, the fuel cell 10 of this embodiment discharges the produced water HO outflowed to the in-stack gas discharge manifolds 100OT to the gas discharge side by carrying the produced water HO on the flows of gas. At the gas discharge side, the in-stack gas discharge manifolds 100OT communicate with the first gas discharge manifolds 160OT of the terminal plate 160F, the second gas discharge manifolds 165OT of the insulating plate 165F, and the third gas discharge manifolds 170OT of the end plate 170F in this order. Moreover, the fuel cell 10 of this embodiment is provided with the height differences in the vertical directions at the manifold lower walls 160b, 165b and 170b as described above for the gas discharge manifolds to form the steps on the gas discharge side of the oxidizing gas discharge manifolds 174OT so that the steps are lower in the vertical directions toward the gas discharge side. Therefore, according to the fuel cell 10 of this embodiment, the produced water HO reached to a point just before the first gas discharge manifold 160OT on the gas discharge side can efficiently be discharged to this first gas discharge manifold 160OT also by the weight of the produced water HO itself in addition to the flow of gas. Similarly, the produced water HO reached to the first gas discharge manifold 160OT on the gas discharge side can efficiently be discharged to the second gas discharge manifold 165OT also by the weight of the produced water HCl itself in addition to the flow of gas. Additionally, the produced water HO reached to the second gas discharge manifold 165OT on the gas discharge side can efficiently be discharged to the third gas discharge manifold 170OT also by the weight of the produced water HO itself in addition to the flow of gas. As the results of these, according to the fuel cell 10 of this embodiment, the residual moisture in the oxidizing gas discharge manifolds 174OT including the in-stack gas discharge manifolds 100OT can efficiently be reduced. In addition, since the reduction of residual moisture can be achieved by height adjustments of the manifold lower walls 160b, 165b and 170b in the gas discharge manifolds, a fabrication of the manifolds of the terminal plate 160F, the insulating plate 165F, and the end plate 170F which constitute the fuel cell 10 is simpler, thereby reducing cost.

Further, even if the produced water HO remains inside the oxidizing gas discharge manifold 174OT, most of the produced water HO remains at any of the steps of the manifold lower wall 160b, the manifold lower wall 165b, or the manifold lower wall 170b. Therefore, even if the produced water HO remained at these steps is frozen, the frozen produced water only buries the steps, and thereby cross-sectional areas of the gas flow paths from the in-stack gas discharge manifold 100OT to the gas discharge end of the oxidizing gas discharge manifold 174OT can be secured. As a result, the gas blockade in the oxidizing gas discharge manifold 174OT due to the frozen residual produced water can also be avoided, thereby securing the ability of a cold start of the fuel cell 10.

Next, another embodiment is described. FIG. 3 is a cross-sectional view schematically illustrating a manifold structure at a gas discharge side of the unit cells 100 of a fuel cell 10A in another embodiment, similar to FIG. 2. The fuel cell 10A of this embodiment also takes the same vehicle mounting posture in which the oxidizing gas discharge manifolds 174OT including the in-stack gas discharge manifolds 100OT are oriented horizontally, as illustrated in the drawing. As illustrated, in the fuel cell 10A, each of the in-stack gas discharge manifolds 100OT communicates with the first gas discharge manifold 160OT, the second gas discharge manifold 165OT, and the third gas discharge manifold 170OT in this order, and the height differences in the vertical directions are provided at the manifold lower walls 160b, 165b and 170b as described above for the gas discharge manifold to form the steps on the gas discharge side of the oxidizing gas discharge manifold 174OT so that the steps are lower in the vertical directions toward the gas discharge side.

Additionally, in the fuel cell 10A of this embodiment, a manifold upper wall 160t of the first gas discharge manifold 160OT is lower in the vertical directions than a manifold upper wall 100t of the in-stack gas discharge manifold 100OT, a manifold upper wall 165t of the second gas discharge manifold 165OT is lower in the vertical directions than the manifold upper wall 160t of the first gas discharge manifold 160OT, a manifold upper wall 170t of the third gas discharge manifold 170OT is lower in the vertical directions than the manifold upper wall 165t of the second gas discharge manifold 165OT. Thus, the fuel cell 10A forms the steps on the gas discharge side of the oxidizing gas discharge manifold 174OT, of which manifold upper walls extend lower in the vertical directions toward the gas discharge side. The steps, i.e., the height differences of the manifold upper walls, upward in the vertical directions are reserved at dimensions of about several millimeters, which are certainly guaranteed even if stacking offsets of any of the unit cell 100, the terminal plate 160F, the insulating plate 165F, and the end plate 170F exist within their tolerance ranges.

The fuel cell 10A of this embodiment forces the discharging gas flowed to the first gas discharge manifold 160OT to collide with the manifold upper wall 160t of the first gas discharge manifold 160OT. The discharging gas flowed to the second gas discharge manifold 165OT is then forced to collide with the manifold upper wall 165t the second gas discharge manifold 165OT, and, similarly, the discharging gas flowed to the third gas discharge manifold 170OT is also forced to collide with the manifold upper wall 170t of the third gas discharge manifold 170OT. By such gas collisions, at least a part of the discharging gas flows toward the manifold lower wall 160b located below in the vertical direction of the first gas discharge manifold 160OT, the manifold lower wall 165b located below in the vertical direction of the second gas discharge manifold 165OT, and the manifold lower wall 170b located below in the vertical direction of the third gas discharge manifold 170OT. In other words, downward flows are generated on the discharge side with respect to the terminal plate 160F. Therefore, according to the fuel cell 10A of this embodiment, the discharging efficiency of the produced water HO which rides the flows of gas further increases, and the residual moisture in the oxidizing gas discharge manifold 174OT can be reduced with high effectiveness. Note that, in the second embodiment, the height differences of the upper walls between respective plates are smaller than the height differences of the lower walls. As a result, the flow path cross-sectional area of the second gas discharge manifold 165OT in the insulating plate 165F is larger than the flow path cross-sectional area of the first gas discharge manifold 160OT in the terminal plate 160F, and the flow path cross-sectional area of the third gas discharge manifold 170OT in the end plate 170F is larger than the flow path cross-sectional area of the second gas discharge manifold 165OT in the insulating plate 165F. Therefore, even if the produced water HO remained in the steps is frozen, the flow path cross-sectional area of each plate is fully secured.

The present invention is not limited to the embodiments described above, and can be implemented in various structures without departing from the scope of the invention. For example, technical features in the embodiments corresponding to technical features of each aspect cited in the section of "SUMMARY OF THE INVENTION," can suitably be substituted and/or combined in order to achieve some or all of the subjects described above, or in order to obtain some or all of the effects described above. The technical features can suitably be deleted if they are not described as essential matters in this specification. For example, in the embodiments described above, the height of the manifold lower wall 170b of the end plate 170F may be the same as the height of the manifold lower wall 165b of the insulating plate 165F. The same can be said for the heights of the manifold upper walls of both the plates 170F and 165F in the second embodiment. Further, side walls in the X-directions of the manifolds of the plates may have spatial relationships such that the side walls are aligned or offset in the X-directions as long as such flow path cross-sectional areas can be secured.

In the embodiments described above, the height differences described above are formed in the manifold lower walls of the oxidizing gas discharge manifold 174OT. However, the height differences may also be formed in the manifold lower walls of the fuel gas discharge manifold 172OT through the terminal plate 160F, the insulating plate 165F, and the end plate 170F on the gas discharge side.

In the embodiments described above, the insulating plate 165F made of resin is, but not limited to be, provided between the terminal plate 160F and the end plate 170F. For example, if the end plate 170F is made of insulating resin, this end plate 170F can achieve the insulation instead of the insulating plate 165F and, thus, the insulating plate 165F can be eliminated.

What is claimed is:

1. A fuel cell, comprising:
   a fuel cell stack having a stacked structure in which a plurality of unit cells generating electric power are stacked;
   a terminal plate that is joined to an end of the fuel cell stack and collects the generated electric power; and
   an insulating plate disposed outside the terminal plate, wherein,
   the terminal plate is provided with a first gas discharge manifold communicating with an in-stack gas discharge manifold on a gas discharge side, the in-stack gas discharge manifold penetrating the fuel cell stack and extending in a stacking direction of the fuel cell stack, and
   the insulating plate is provided with a second gas discharge manifold communicating with the first gas discharge manifold, wherein an inner vertical dimension of the second gas discharge manifold is greater than an inner vertical dimension of the first gas discharge manifold, and in a fuel cell arranging state in which the in-stack gas discharge manifold is substantially horizontal, a manifold lower wall of the second gas discharge manifold is located vertically below a manifold lower wall of the first gas discharge manifold.

2. The fuel cell in accordance with claim 1, wherein, in the fuel cell arranging state, the terminal plate is formed in a shape so that the manifold lower wall of the first gas discharge manifold is located vertically below a manifold lower wall of the in-stack gas discharge manifold.

3. The fuel cell in accordance with claim 2, wherein, in the fuel cell arranging state, the terminal plate is formed in a shape so that a manifold upper wall of the first gas discharge manifold is located vertically below a manifold upper wall of the in-stack gas discharge manifold.

4. The fuel cell in accordance with claim 1, wherein, in the fuel cell arranging state, the insulating plate is formed in a shape so that a manifold upper wall of the second gas discharge manifold is located vertically below a manifold upper wall of the first gas discharge manifold.

5. The fuel cell in accordance with claim 4, wherein, in the fuel cell arranging state, the terminal plate is formed in a shape so that a manifold upper wall of the first gas discharge manifold is located vertically below a manifold upper wall of the in-stack gas discharge manifold.

* * * * *